United States Patent [19]

Imaizumi et al.

[11] Patent Number: 4,647,765

[45] Date of Patent: Mar. 3, 1987

[54] IMAGE SENSING HEAD OF IMAGE READING DEVICE HAVING LIGHT SHIELD AND BASE PLATE DISPOSED AT END FACE THEREOF

[75] Inventors: Mamoru Imaizumi, Nagoya; Yujiro Ishikawa, Toyoda; Eiichi Ohta, Handa; Shizuo Sato; Kazuyuki Matsushita, both of Nagoya, all of Japan

[73] Assignee: Brother Industries, Ltd., Nagoya, Japan

[21] Appl. No.: 657,750

[22] Filed: Oct. 4, 1984

[30] Foreign Application Priority Data

| Oct. 8, 1983 | [JP] | Japan | 58-188702 |
| Oct. 8, 1983 | [JP] | Japan | 58-188703 |
| Oct. 8, 1983 | [JP] | Japan | 58-188704 |
| Oct. 8, 1983 | [JP] | Japan | 58-156259 |

[51] Int. Cl.$^4$ .......................... H01J 5/16; H01J 40/14
[52] U.S. Cl. .................................. 250/227; 350/96.25
[58] Field of Search ...................... 250/227; 350/96.25, 350/96.26, 96.27; 358/200

[56] References Cited

U.S. PATENT DOCUMENTS

| 3,857,361 | 12/1974 | Gibson et al. | 350/96.27 |
| 4,287,414 | 9/1981 | Soo et al. | 250/227 |
| 4,304,630 | 12/1981 | Tanner | 250/227 |
| 4,469,941 | 9/1984 | Palmer | 350/96.25 |
| 4,499,649 | 2/1985 | Maxner | 250/227 |

Primary Examiner—David C. Nelms
Assistant Examiner—William L. Oen
Attorney, Agent, or Firm—Kane, Dalsimer, Kane, Sullivan and Kurucz

[57] ABSTRACT

An image sensing head of an image reading device and a method of producing same are disclosed. The image sensing head includes a plurality of optical fibers and light emitting and light receiving elements supported in a manner to provide a unitary structure. The optical fibers of the light emitting side and the optical fibers of the light receiving side are each formed as a sheet and arranged such that the read-out ends of the optical fibers of the light emitting side are located in positions in which they supply read-out light beams to an image surface of a document and the light emitting ends thereof are located in positions corresponding to those of the light emitting elements while the read-out ends of the optical fibers of the light receiving side are located in positions in which they receive light beams reflected by the image surface of the document and the light receiving ends thereof are located in positions corresponding to those of the light receiving elements.

4 Claims, 15 Drawing Figures

IMAGE SENSING HEAD OF IMAGE READING DEVICE HAVING LIGHT SHIELD AND BASE PLATE DISPOSED AT END FACE THEREOF

FIELD OF THE INVENTION

This invention relates to an image sensing head of an image reading device using optical fibers and a method of producing such image sensing head.

DESCRIPTION OF THE PRIOR ART

FIG. 1 shows one example of the image reading device using optical fibers of the prior art which comprises an image sensing head 4 supported on a guide rod 3 located parallel to a support drum 2 on which a document 1 is wound and movable axially of the guide rod 3 for reciprocatory movement. The image sensing head 4 includes a light emitting section and a light receiving section which are optically connected through a multiplicity of optical fibers 7 of the light emitting side and a multiplicity of optical fibers 8 of the light receiving side, respectively, which are exposed, not covered, with a light emitting/light receiving header 6 comprising a multiplicity of light emitting elements and light receiving elements mounted to a main body frame 5. In this arrangement, the optical fibers 7 of the light emitting side and the optical fibers 8 of the light receiving side extending from the image sensing head 4 to the light emitting/ light receiving header 6 are considerably great in length and exposed. This arrangement has given rise to the problem that the optical fibers 7 and 8 tend to be damaged by contact with other parts when the device is assembled, thereby causing deterioration to occur in light transmittability. When the optical fibers 7 and 8 catch against other parts and is bent at an angle greater than the predetermined angle, transmitting of light becomes impossible to perform. Thus, the image reading device of the prior art has suffered the disadvantage that the image sensing head 4 is unable to positively read the image of the document 1. To solve these problems, proposals have been made to cover the optical fibers 7 of the light emitting side and the optical fibers 8 of the light receiving side with tubes of flexible material. However, the use of the covering tubes has resulted in a reduction in operability because the assembling operation is time-consuming and requires a lot of labor.

SUMMARY OF THE INVENTION

This invention has been developed for the purpose of obviating the aforesaid problems of the prior art. Accordingly, a principal object of the invention is to provide an image sensing head of an image reading device capable of positively reading an image of a document without the optical fibers being damaged or bent.

Another object is to provide an image sensing head of an image reading device enabling optical fibers to be positively and readily assembled in position with a high degree of positional precision and accuracy.

Still another object is to provide an image sensing head of an image reading device which enables optical fibers to be positively and readily assembled with a high degree of positional precision and accuracy by forming constituent parts as a plurality of blocks.

A further object is to provide a method of producing an image sensing head of an image reading device capable of avoiding damage to the optical fibers and preventing bending of the optical fibers while allowing an image of a document to be positively read out.

The outstanding characteristics of the invention enabling the aforesaid objects to be accomplished include a image sensing head of a simple construction including a plurality of optical fibers and light emitting and light receiving elements arranged as a unitary structure, in which the read-out end portions of the optical fibers are exposed to one end face of the head and the light emitting and light receiving end portions of the optical fibers are exposed to an opposite end face of the head, and the light emitting and light receiving elements are located in positions corresponding to those of the plurality of optical fibers, and a method of producing an image sensing head comprising the steps of winding on a takeup drum removably mounting a plurality of support members an optical fiber with a predetermined spacing interval between the fibers in such a manner as to traverse the support members, fixing to the support members the optical fiber wound on the takeup drum, cutting the optical fiber wound on the takeup drum, and covering the optical fiber secured to the support members with a synthetic resinous material.

The image sensing head produced by the method according to the invention and constructed as aforesaid is capable of avoiding damage to the plurality of optical fibers for transmitting and receiving light beams and preventing their bending, to enable a recorded image to be positively read out.

These and other objects as well as the features and advantages of the invention will become apparent from the description set forth hereinafter when considered in conjunction with the accompanying drawings.

DESCRIPTION OF THE PREFERRED EMBODIMENTS

Preferred embodiments of the invention will now be described by referring to the accompanying drawings.

Figure 1:
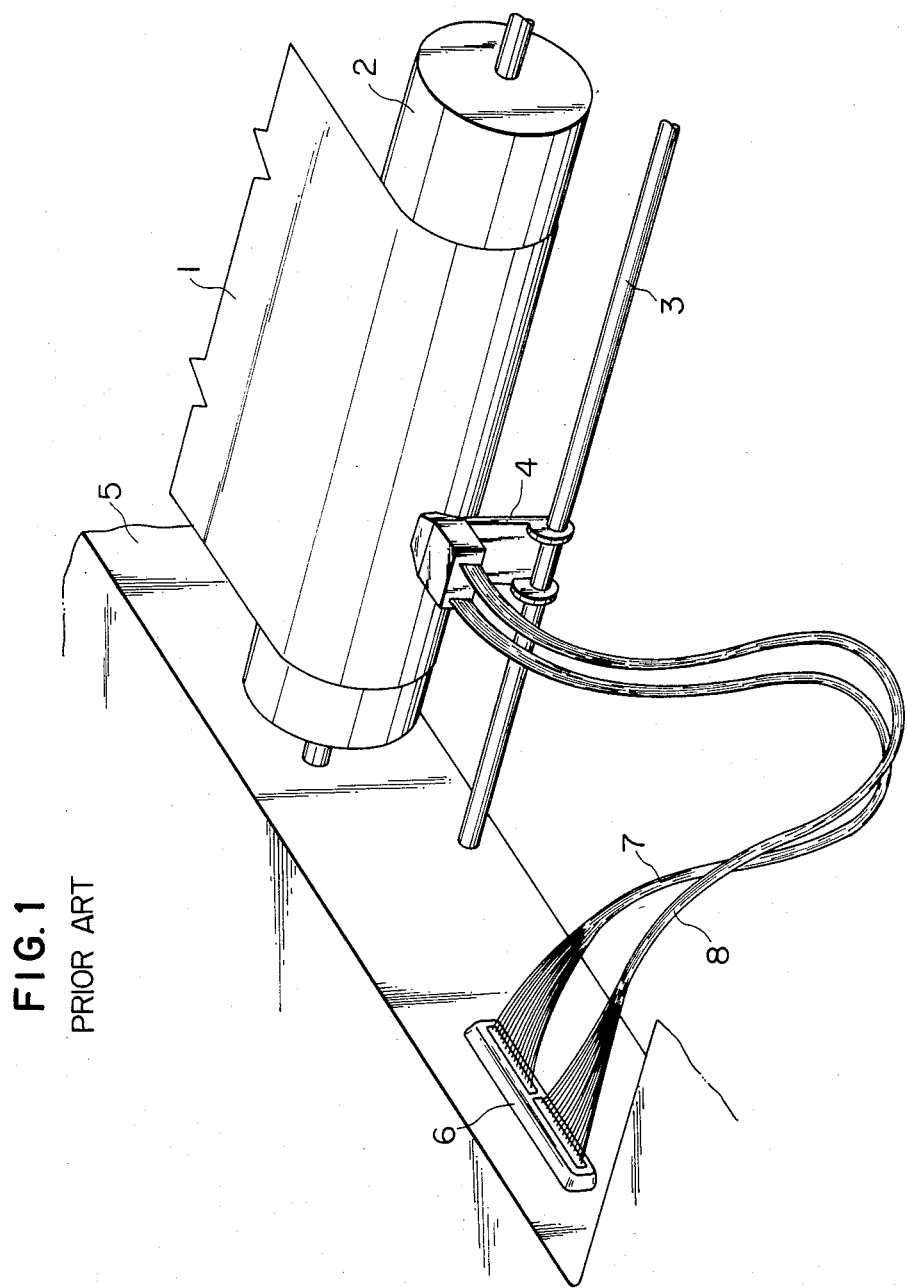
FIG. 1 is a perspective view of one example of image sensing head of an image reading device of the prior art.
Figure 2:
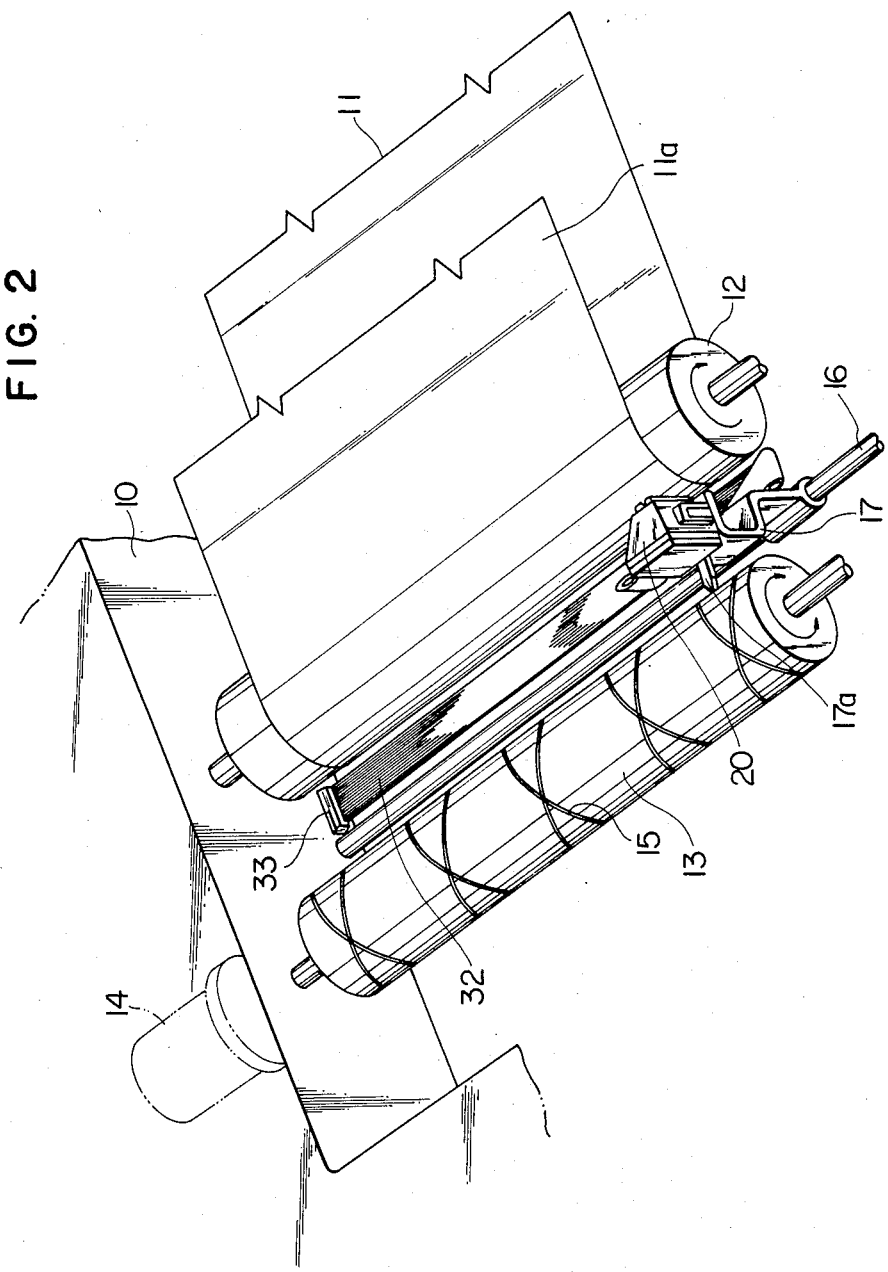
FIG. 2 is a perspective view of the image reading device according to the invention.
Figure 3:
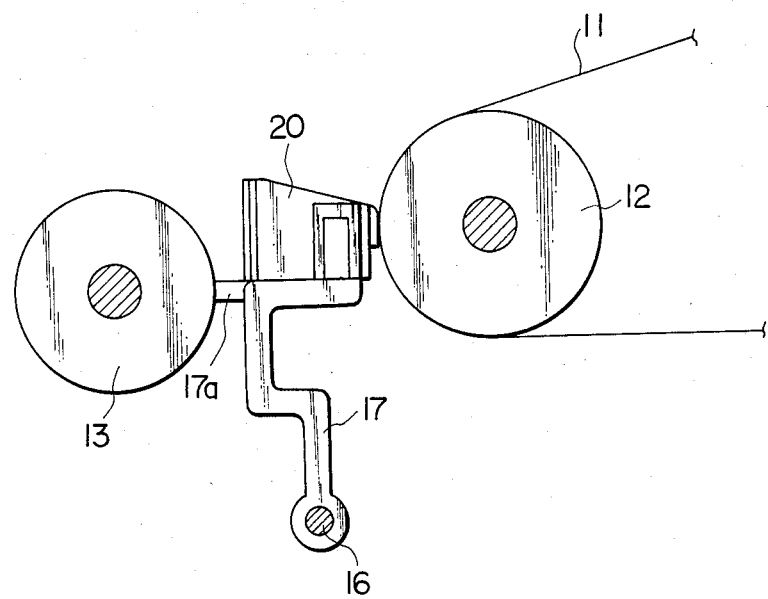
FIG. 3 is a view in explanation of the manner in which the carriage is supported.

Referring to FIG. 2, a main body frame 10 supports a drum 12 for rotation which has wound thereon a document 11 which is fed in a direction perpendicular to the axis of the drum 12 as the latter rotates. The main body frame 10 also supports a drive shaft 13 disposed parallel to the drum for rotation. The drive shaft 13 which is formed on its outer peripheral surface with a spiral cam groove 15 is driven for rotation by a DC motor 14 secured to the main body frame 10. A guide shaft 16 arranged parallel to the drive shaft 13 supports a carriage 17 for movement, as shown clearly in FIG. 3. The carriage 17 is formed at a rear face of an upper end portion thereof with an engaging claw 17a which engages the spiral cam groove 15 on the drive shaft 13, so that rotation of the drive shaft 13 by the DC motor 14 causes the carriage 17 to move in reciprocatory movement axially of the guide shaft 16. The carriage 17 supports at the the upper end portion thereof an image sensing head 20 which is brought at a front face thereof into contact with an image surface 11a of the document 11, so as to successively read out information recorded on the image surface 11a of the document by moving transversely as the carriage 17 moves in reciprocatory movement.

Figure 4:
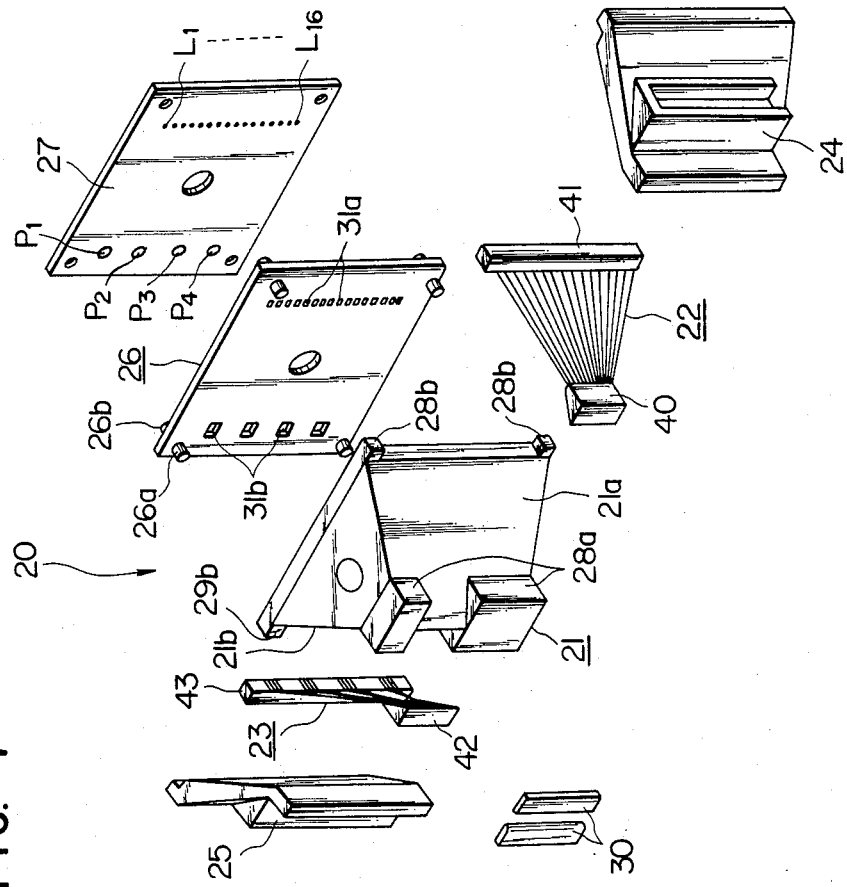
FIG. 4 is an exploded perspective view of the image sensing head of the image reading device shown in FIG. 2.

The image sensing head 20 will be described in detail. As shown in FIG. 4, the image sensing head 20 comprises a center block 21 formed of a synthetic resinous material constituting a part of the image sensing head block, an optical fiber sheet 22 of the light emitting side, an optical fiber sheet 23 of the light receiving side, side covers 24 and 25 formed of a synthetic resinous material by injection molding constituting a part of the image sensing head block, a light shield plate 26 and a base plate 27.

The center block 21 is formed by injection molding in such a manner that left and right side surfaces 21a and 21b cross each other at an angle of about 60 degrees in the front of the center block 21. A pair of upper and lower fixing portions 28a and 29a for fixing thereto first support members 40 and 42, respectively, which are presently to be described are formed integrally on front surfaces of the left and right side surfaces 21a and 21b. A pair of upper and lower fixing portions 28b and 29b for fixing thereto second support members 41 and 43, respectively, which are presently to be described are formed integrally on rear surfaces of the left and right side surfaces 21a and 21b.

Figure 5:
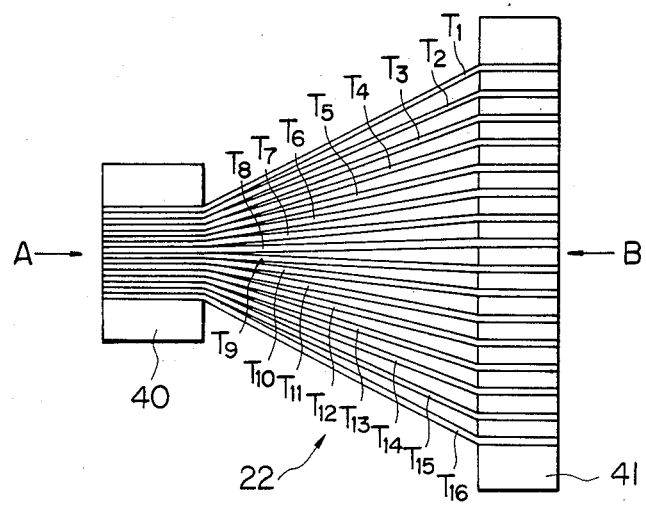
FIG. 5 is a view, on an enlarged scale, in explanation of the optical fiber sheet on the light emitting side.

Referring to FIG. 5, the optical fiber sheet 22 of the light emitting side comprises first to sixteenth light emitting optical fibers $T_1-T_{16}$, and the first and second support members 40 and 41 for supporting the first to sixteenth light emitting optical fibers $T_1-T_{16}$ in the form of a sheet. Read-out end portions of the first to sixteenth light emitting optical fibers $T_1-T_{16}$ are adhesively secured to the first support member 40 in such a manner that they are spaced apart from each other in accordance with the read-out resolving power. Light emitting end portions of the first to sixteenth light emitting optical fibers $T_1-T_{16}$ are adhesively secured to the second support member 41 and spaced apart from each other by a spacing interval equal to the spacing interval of light emitting elements $L_1-L_{16}$ presently to be described.

Figure 6:
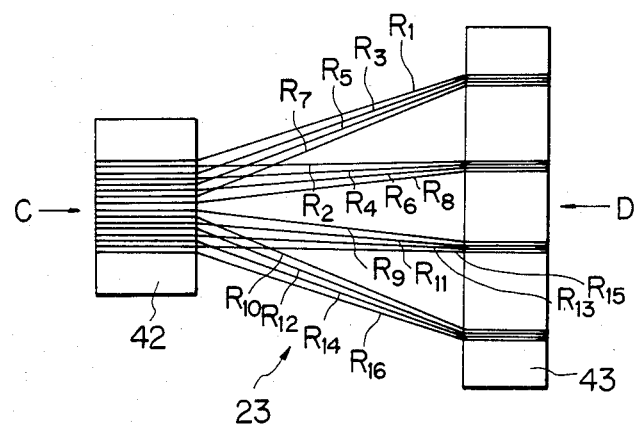
FIG. 6 is a view, on an enlarged scale, in explanation of the optical fiber sheet on the light receiving side.
Figure 7:
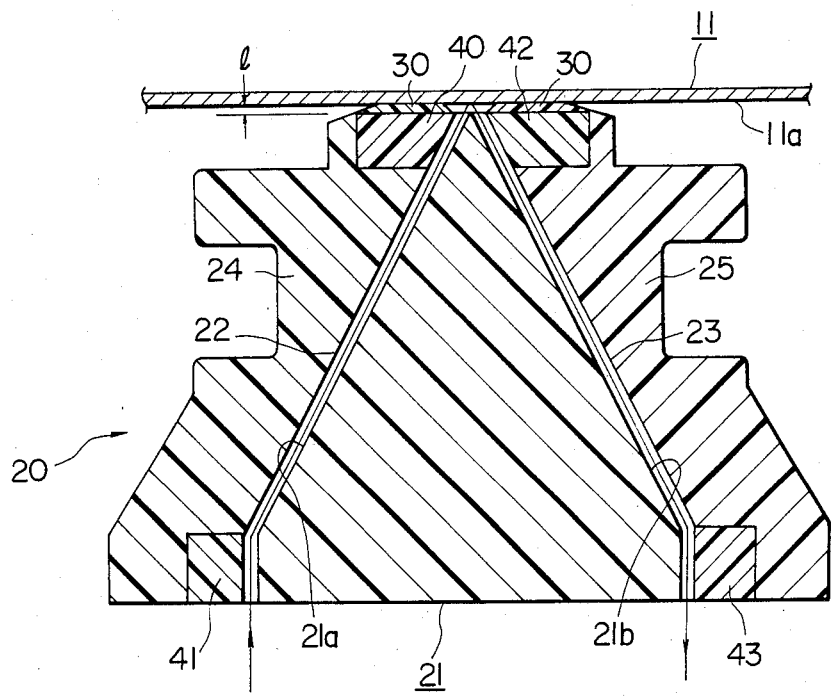
FIG. 7 is a transverse sectional view, on an enlarged scale, of the image sensing head, showing the arrangement of the optical fiber sheet of the light emitting side and the optical fiber sheet of the light receiving side with respect to the image bearing surface of a document.

Referring to FIG. 6, the optical fiber sheet 23 of the light receiving side comprises first to sixteenth light receiving optical fibers $R_1-R_{16}$, and the first and second support members 42 and 43 for supporting the first to sixteenth light receiving optical fibers $R_1-R_{16}$ in the form of a sheet. Readout end portions of the first to sixteenth light receiving optical fibers $R_1-R_{16}$ are adhesively secured to the first support member 42 with the same spacing interval as the light emitting optical fibers $T_1-T_{16}$. Light receiving end portions of the light receiving optical fibers $R_1-R_{16}$ are adhesively secured to the second support member 43 and spaced apart from each other by a spacing interval equal to the spacing interval of light receiving elements $P_1-P_4$ presently to be described. The light receiving end portions of the first to sixteenth light receiving optical fibers $R_1-R_{16}$ are arranged such that the light receiving optical fibers $R_1$, $R_3$, $R_5$ and $R_7$, the light receiving optical fibers $R_2$, $R_4$, $R_6$ and $R_8$, the light receiving optical fibers $R_9$, $R_{11}$, $R_{13}$ and $R_{15}$ and the light receiving optical fibers $R_{10}$, $R_{12}$, $R_{14}$ and $R_{16}$ are positioned against the light receiving element $P_1$, the light receiving element $P_2$, the light receiving element $P_3$ and the light receiving element $P_4$, respectively. The optical fiber sheet 22 of the light emitting side and the optical fiber sheet 23 of the light receiving side are mounted to the center block 21 and located on the left and right side surfaces 21a and 21b respectively by fitting the first and second support members 40 and 41 to the fixing portions 28a and 28b respectively and securing same and by fitting the first and second support members 42 and 43 to the fixing portions 29a and 29b respectively and securing same. When the optical fiber sheets 22 and 23 are mounted to the center block 21 as aforesaid, the read-out end portions of the first to sixteenth light emitting optical fibers $T_1-T_{16}$ and first to sixteenth light receiving optical fibers $R_1-R_{16}$ are exposed at the front surface of the center block 31, and the light emitting end portions of the first to sixteenth emitting optical fibers $T_1-T_{16}$ and the light receiving end portions of the first to sixteenth light receiving optical fibers $R_1-R_{16}$ are exposed at the rear surface of the center block 21. This arrangement allows, as shown in FIG. 7, a light beam transmitted through the read-out end of each of the light emitting optical fibers $T_1-T_{16}$ is reflected at a predetermined angle of about 60 degrees by the image surface 11a of the document 11 spaced apart from the front surface of the center block 21 a predetermined distance 1 and incident on the read-out end of each of the first to sixteenth light receiving optical fibers $R_1-R_{16}$. A spacer 30 adapted to come into contact with the image surface 11a to keep the distance between the front surface of the center block 21 and the image surface 11a of the document 11 substantially at the predetermined value 1 is secured to an upper portion of the front surface of the center block 21.

Figure 8A:
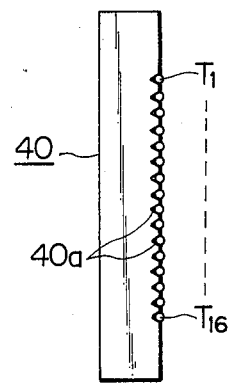
FIG. 8(A) is a side view, on an enlarged scale, of the optical fiber sheet as viewed in the direction of the arrow A in FIG. 5.
Figure 8B:
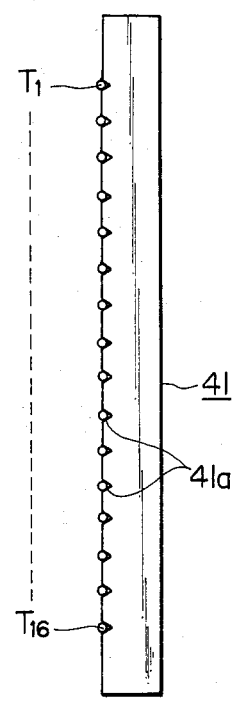
FIG. 8(B) is a side view, on an enlarged scale, of the optical fiber sheet as viewed in the direction of the arrow B in FIG. 5.
Figure 9A:
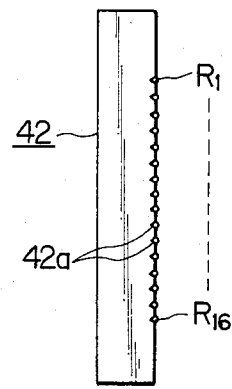
FIG. 9(A) is a side view, on an enlarged scale, of the optical fiber sheet as viewed in the direction of the arrow C in FIG. 6.
Figure 9B:
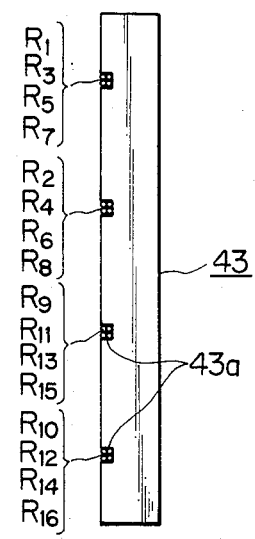
FIG. 9(B) is a side view, on an enlarged scale, of the optical fiber sheet as viewed in the direction of the arrow D in FIG. 6.

As shown in FIGS. 8(A) and 8(B), the first support member 40 and second support member 41 are formed with a plurality of support recesses 40a and a plurality of support recesses 41a for supporting the read-out end portions and the light emitting end portions of the first to sixteenth light emitting optical fibers $T_1$-$T_{16}$, respectively, with a predetermined spacing interval between the fibers. As shown in FIGS. 9(A) and 9(B), the first support member 42 and second support member 43 are formed with a plurality of support recesses 42a and a plurality of support recesses 43a for supporting the read-out end portions and light receiving end portions of the first to sixteenth light receiving optical fibers $R_1$-$R_{16}$, respectively, with a predetermined spacing interval between the fibers.

Side covers 24 and 25 are adhesively secured to the left and right side surfaces 21a and 21b of the center block 21 to which the optical fiber sheet 22 of the light emitting side and the optical fiber sheet 23 of the light receiving side are secured, respectively. Thus, the side covers 24 and 25 provide covers to the light emitting optical fibers $T_1$-$T_{16}$ and light receiving optical fibers $R_1$-$R_{16}$, respectively.

Adhesively secured to the back of the center block 21 is the light shield plate 26 which is formed with a multiplicity of apertures 31a and 31b corresponding to the light emitting ends of the first to sixteenth light emitting optical fibers $T_1$-$T_{16}$ and the light receiving ends of the first to sixteenth light receiving optical fibers $R_1$-$R_{16}$, respectively. This keeps light beams emitted by the light emitting elements $L_1$-$L_{16}$ from being incident on the adjacent first to sixteenth light emitting optical fibers $T_1$-$T_{16}$ and keeps light beams transmitted by the light receiving optical fibers $R_1$-$R_{16}$ from being incident on the adjacent receiving elements $P_1$-$P_{16}$. Pins 26a and 26b are formed integrally on front and rear surfaces of the light shield plate 26 for positioning the light shield plate 26 with respect to the center block 21 and the base plate 27, respectively. Thus, when the image sensing head 20 is assembled, relative positioning of the center block 21 with respect to the light shield plate 26 and base plate 27 can be readily effected by means of the pins 26a and 26b.

The base plate 27 is adhesively secured to the rear surface of the light shield plate 26. The light emitting elements $L_1$-$L_{16}$ corresponding to the light emitting ends of the first to sixteenth light emitting optical fibers $T_1$-$T_{16}$ and the light receiving elements $P_1$-$P_4$ corresponding to the light receiving ends of the light receiving optical fibers $R_1$-$R_{16}$ are located with a predetermined spacing interval between the fibers on the base plate 27. The light emitting elements $L_1$-$L_{16}$ and light receiving elements $P_1$-$P_4$ are electrically connected to a connector 33 (see FIG. 2) of the main body frame 10 via flexible cables 32 in the form of substrate having a multiplicity of electric wires printed thereon. The light receiving elements $P_1$-$P_4$ each have an amplifier circuit built therein to provide a unitary structure.

The method of producing the fiber sheet 22 of the light emitting side and the optical fiber sheet 23 of the light receiving side will now be described.

Figure 10:
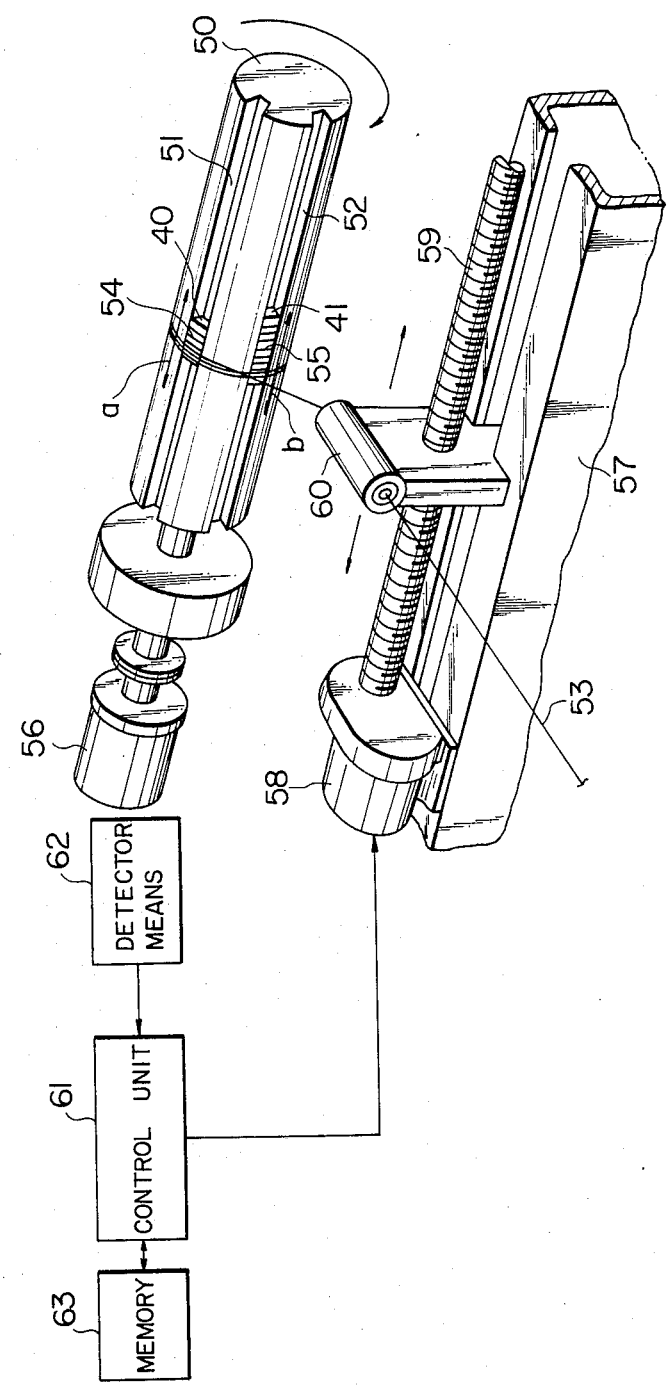
FIG. 10 is a perspective view of an apparatus suitable for carrying into practice the method of producing the optical fiber sheet of the light emitting side and the optical fiber sheet of the light receiving side according to the invention.

FIG. 10 shows an apparatus suitable for producing the optical fiber sheet 2 of the light emitting side and the optical fiber sheet 23 of the light receiving side, although the apparatus is shown as being producing the optical fiber sheet 22 of the light emitting side. As shown, a take-up drum 50 is formed at its outer periphery with a plurality of axially extending support grooves 51 and 52 for detachably supporting the first support member 40 and second support member 41, respectively. Also, a multiplicity of pins 54 and 55 are attached to the outer periphery of the take-up drum 50 and spaced apart from each other by a spacing interval corresponding to the spacing interval with which the read-out portions and light emitting end portions of the first to sixteenth light emitting optical fibers $T_1$-$T_{16}$ are located. The take-up drum 50 is rotated at a predetermined peripheral velocity by an electric motor 56.

Supported on a support frame 57 and located parallel to the axis of the take-up drum 50 is a feed screw 59 connected to a step motor 58 to be driven thereby which supports a guide 60 for reciprocatory movement axially of the feed screw 59 to supply an optical fiber 53 to a predetermined winding position at the outer periphery of the take-up drum 50.

As the take-up drum 50 having the first support member 40 and second support member 41 supported in the support grooves 51 and 52 respectively is rotated in the direction of a solid line arrow, a control unit 61 controls the step motor 58 and allows same to rotate both in the normal and reverse directions in accordance with a winding pattern of the optical fiber sheet 22 of the light emitting side retrieved from a memory 63 in accordance with detection signals produced by a detector 62 for detecting the rotational angle of the take-up drum 50 mounted to the electric motor 56. Thus, the optical fiber 53 supplied from the guide 60 moving in reciprocatory movement axially of the take-up drum 50 is wound on the output periphery of the take-up drum 50 while being positioned as shown in FIG. 5 between the first support member 40 and second support member 41.

Then, the optical fiber 53 wound on the outer periphery of the take-up drum 50 is secured as by an adhesive agent to the first support member 40 and second support member 41. Thereafter, the optical fiber 53 is severed by a cutter along the front surface (indicated by a phantom line a in FIG. 10) of the first support member 40 and along the rear surface (indicated by a phantom line b) of the second support member 41, so as to provide the optical fiber sheet 22 of the light emitting side interposed between the phantom lines a and b.

Referring to FIG. 4 again, the optical fiber sheet 22 of the light emitting side and the optical fiber sheet 23 of the light receiving side are attached to the center block 21 so as to be located on the left and right side surfaces 21a and 21b respectively as the first support member 40 and second support member 41 are fitted and secured to the fixing portions 28a and 28b and the first support member 42 and second support member 43 are fitted and secured to the fixing members 29a and 29b respectively. When the optical fiber sheets 22 and 23 are attached to the center block 21 as aforesaid, the read-out ends of the first to sixteenth light emitting optical fibers $T_1$-$T_{16}$ and the first to sixteenth light receiving optical fibers $R_1$-$R_{16}$ are exposed at the front surface of the center block 21 and the light emitting end light receiving ends thereof are exposed at the rear surface of the center block 21. By this arrangement, a light beam transmitted from the read-out end of each of the first to sixteenth light emitting optical fibers $T_1$-$T_{16}$ is reflected, as shown in FIG. 7, at the predetermined angle of about 60 degrees by the image surface 11a of the document 11 which is spaced apart from the front surface of the center block 21 by the predetermined distance l and incident on the read-out end of each of the first to sixteenth light receiving optical fibers $R_1$-$R_{16}$.

The method of producing the image sensing head 20 will now be described. The optical fiber sheet 22 of the light emitting side supported by the first support member 40 and second support member 41 and the optical fiber sheet 23 of the light receiving side supported by the first support member 42 and second support member 43 are mounted to the left and right side surfaces 21a and 21b, respectively, of the center block 21 formed by injection molding beforehand by attaching the first support member 40 and second support member 42 to the fixing portions 28a and 28b and the first support member 42 and second support member 43 to the fixing portions 29a and 29b respectively. Then, the side covers 24 and 25 formed beforehand by injection molding are adhesively secured to the left and right side surfaces 21a and 21b of the center block 21 to which the optical fiber sheet 22 of the light emitting side and the optical fiber sheet 23 of the light receiving side are mounted, respectively, to provide covers to the first to sixteenth light emitting optical fibers $T_1$-$T_{16}$ and the first to sixteenth light receiving optical fibers $R_1$-$R_{16}$. Thereafter, the read-out faces and light emitting and light receiving end faces of the first to sixteenth light emitting optical fibers $T_1$-$T_{16}$ and the first to sixteenth light receiving optical fibers $R_1$-$R_{16}$ are polished to bring them into alignment with the front surface and rear surface of the assembled image sensing head 20. The spacer 30 is adhesively attached to the front surface of the image sensing head 20. When the image sensing head 20 is assembled in this way, the distance l between the read-out ends of the first to sixteenth light emitting optical fibers $T_1$-$T_{16}$ and the first to sixteenth light receiving optical fibers $R_1$-$R_{16}$ can be kept substantially at a predetermined value. The light shield plate 26 and base plate 29 are adhesively secured to the rear surface of the image sensing head 20. The provision of the pins 26a and 26b to the light shield plate 26 enables relative positioning of the light shield plate 26 and base plate 27 with respect to the center block 21 to be readily effected.

In the method according to the invention described hereinabove, the optical fiber sheet 22 of the light emitting side and the optical fiber sheet 23 of the light receiving side having side having the read-out end portions and light emitting and light receiving end portions of the respective optical fibers $T_1$-$T_{16}$ and $R_1$-$R_{16}$ secured with the predetermined spacing intervals between the fibers to the first and second support members 40, 41, 42 and 43 are obtained by winding the optical fiber 53 on the outer periphery of the take-up drum 50. The image sensing head 20 is readily obtained by mounting the optical fiber sheet 22 of the light emitting side and the optical fiber sheet 23 of the light receiving side on the left and right side surfaces 21a and 21b of the center block 21 formed by injection molding beforehand and then by covering the sheets 22 and 23 with the side covers 24 and 25, respectively.

Figure 11:
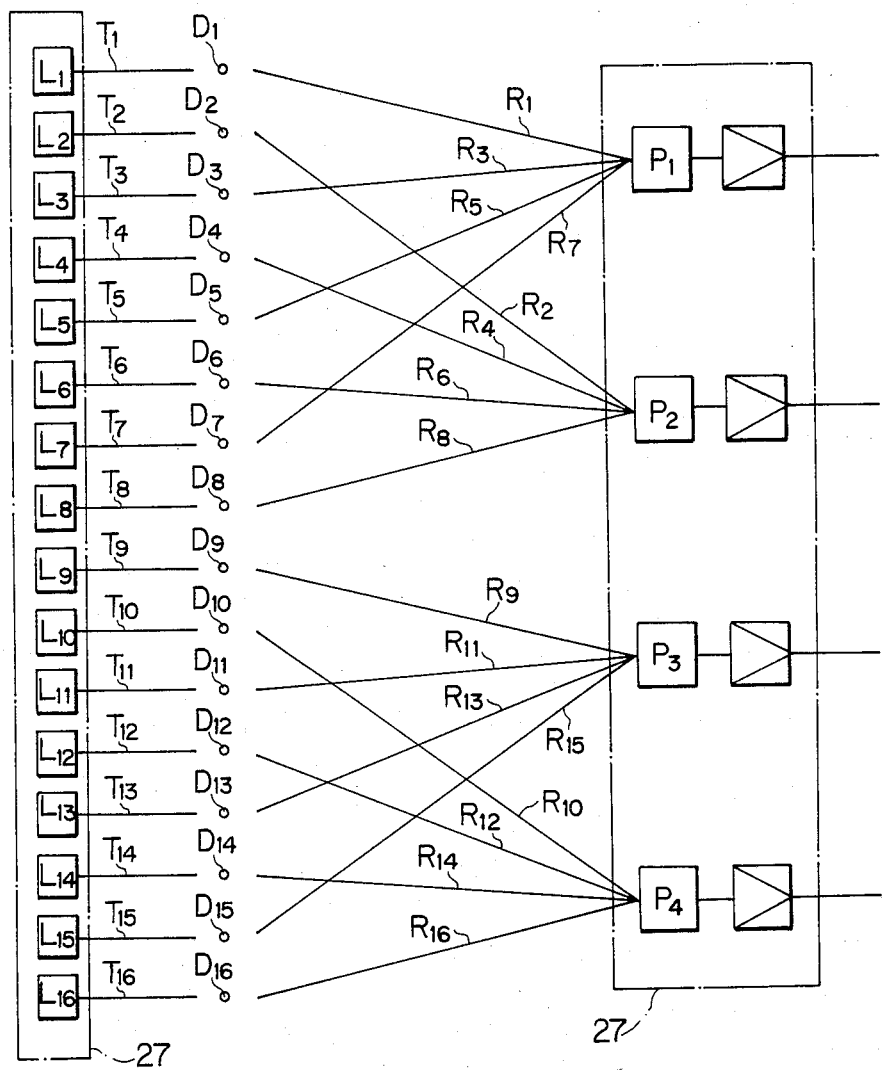
FIG. 11 is a view in explanation of the manner in which the image sensing head according to the invention performs an information read-out operation.
Figure 12A:
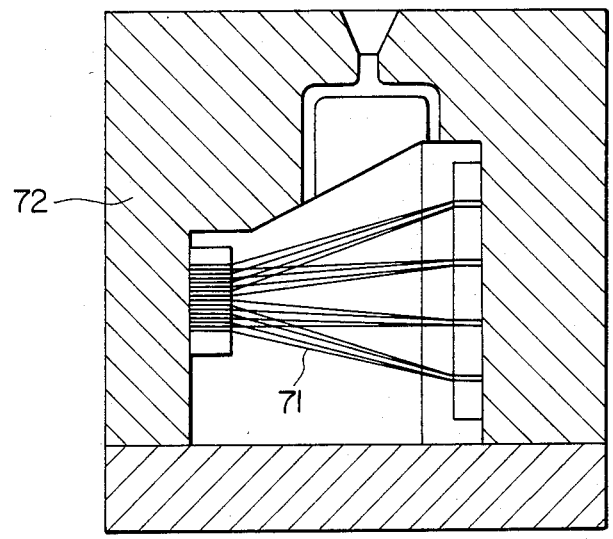
FIG. 12(A) is a vertical sectional view of a modification of the apparatus for producing the image sensing head by the method according to the invention.
Figure 12B:
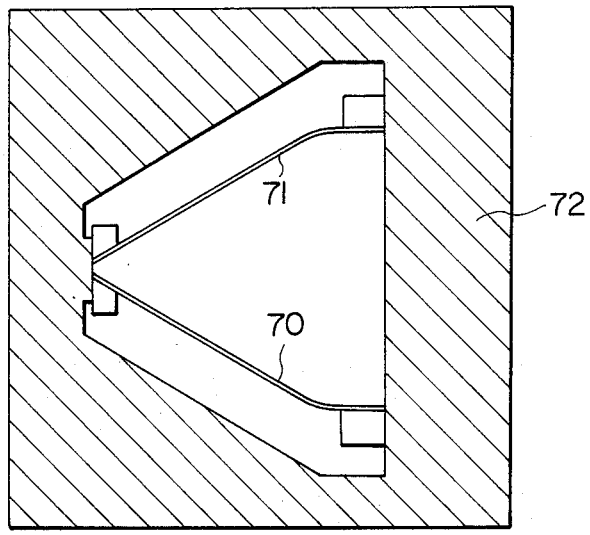
FIG. 12(B) is a transverse sectional view of the modification of the apparatus for producing the image sensing head by the method according to the invention shown in FIG. 12(A).

Operation of the optical read-out device comprising the image sensing head 20 of the aforesaid construction will be described. As the drive shaft 13 shown in FIG. 2 is rotated, the image sensing head 20 moves intermittently axially of the drive shaft 13, and each time the image sensing head 20 is brought to a halt, the light emitting elements $L_1$-$L_{16}$ are successively turned on and off starting with the light emitting element $T_1$ and ending with the light emitting element $T_{16}$ according to the time division system, so that the light beams emitted by the light emitting elements $T_1$-$T_{16}$ are transmitted via the first to sixteenth light emitting optical fibers $T_1$-$T_{16}$ and successively incident on read-out points $D_1$-$D_{16}$ on the image surface 11a of the document 11 as shown in FIG. 11, to illuminate the image surface 11a. The light beams are reflected by the image surface 11a at the read-out points $D_1$-$D_{16}$ and reflected light beams are transmitted via the first to sixteenth light receiving optical elements $R_1$-$R_{16}$ and to the first to fourth light receiving elements $P_1$-$P_4$ which output electric signals corresponding to the quantity of light of the reflected light beams, to enable the image of the readout points $D_1$-$D_{16}$ to be read out.

Meanwhile, when the aforesaid operation is being performed, a portion of the light beam transmitted through the third light emitting optical fiber $T_3$ and directed against the image surface 11a might, for example, be received by the third or fourth light receiving optical fibers $R_2$ or $R_4$ which is adjacent the third light receiving optical fiber $R_3$ due to interference or scattering of light beams. When this occurred, the reflected light beam received by the second or fourth light receiving optical fiber $R_2$ or $R_4$ would be transmitted to the light receiving element $P_2$ but not to the light receiving element $P_1$. As a result, the light receiving element $P_1$ would only output an electric signal of a value which may vary depending on the quantity of the reflected beam from the read-out point $D_3$. Thus, it is possible to positively read out image information of a portion of the image surface 11a corresponding to the readout point $D_3$ from the electric signal produced by the light receiving element $P_1$.

The image sensing head 20 of the embodiment shown and described hereinabove has the first to sixteenth light emitting optical fibers $T_1$-$T_{16}$, the first to sixteenth light receiving optical fibers $R_1$-$R_{16}$, the light emitting elements $L_1$-$L_{16}$ and the light receiving optical elements $P_1$-$P_4$ built therein as a unitary structure. This feature makes it possible to obviate the disadvantage suffered by image sensing heads of the prior art that the first to sixteenth light emitting optical fibers $T_1$-$T_{16}$ and the first to sixteenth light receiving optical fibers $R_1$-$R_{16}$ might be damaged or bent when the parts are assembled or the image sensing head is moved in reciprocatory movement during operations, enabling the image recorded on the image surface 11a of the document 11 to be accurately read out.

In the embodiment of the read-out head constructed as aforesaid according to the invention, the first to sixteenth light optical fibers $T_1$-$T_{16}$ and the first to sixteenth light receiving optical fibers $R_1$-$R_{16}$ are supported in the form of sheets as they are secured to the first and second support members 40 and 41 and 42 and 43, respectively, so that the light emitting optical fibers $T_1$-$T_{16}$ and light receiving optical fibers $R_1$-$R_{16}$ can be attached to the left and right sides surfaces 21a and 21b of the center block 21, respectively, with a high degree of positional precision. The optical fiber sheet 22 of the light emitting side and the optical fiber sheet 23 of the light receiving side mounted to the center block 21 are covered with the side covers 24 and 25 respectively. This allows damage to the first to sixteenth light emitting optical fibers $T_1$-$T_{16}$ and the first to sixteenth light receiving optical fibers $R_1$-$R_{16}$ to be avoided and enables bending thereof to be prevented which might occur when the parts of the image sensing head are assembled or the image sensing head is moved in reciprocatory movement during operations, as happed in the prior art.

In the embodiment of the image sensing head constructed as aforesaid according to the invention, the image sensing head 20 is provided as a unitary structure composed of the center block 21, optical fiber sheet 22 of the light emitting side, optical fiber sheet 23 of the light receiving side, and side covers 24 and 25. This allows the first to sixteenth light emitting optical fibers $T_1$-$T_{16}$ and the first to sixteenth light receiving optical fibers $R_1$-$R_{16}$ to be readily attached to the center block 21 with a high degree of positional precision. After the optical fiber sheet 22 of the light emitting side and optical fiber sheet 23 of the light receiving side are mounted to the center block 21, the first to sixteenth light emitting optical fibers $T_1$-$T_{16}$ and the first to sixteenth light receiving optical fibers $R_1$-$R_{16}$ are covered with the side covers 24 and 25 respectively. This allows the first to sixteenth light emitting optical fibers $T_1$-$T_{16}$ and the first to sixteenth light receiving optical fibers $R_1$-$R_{16}$ to escape damage and bending which might occur when the parts are assembled or the image sensing head 20 moves in reciprocatory movement during operations as is the case with the prior art.

In the embodiment of the image sensing head constructed according to the invention as described hereinabove, the optical fiber sheet 22 of the light emitting side and optical fiber sheet 23 of the light receiving side are secured to the left and right side surfaces 21a and 21b of the center block 21 and then the side covers 24 and 25 are secured to the left and right side surfaces 21a and 21b respectively, to provide the image sensing head 20. However, the invention is not limited to this specific form of the embodiment, and the image sensing head 20 may be produced by arranging and fixing the read-out end portions and light emitting and light receiving end portions of optical fibers 70 of the light emitting side and optical fibers 71 of the light receiving side by suitable means in a metal mold 72 with a predetermined spacing interval between the fibers and then pouring a synthetic resinous material into the metal mold 72 in a manner to mold the synthetic resinous material which covers the optical fibers 70 and 71 of the light emitting and light receiving ends, to provide the image sensing head 20 as a unitary structure. In the embodiment shown in FIGS. 2-11 and described hereinabove, the optical fiber sheet 22 of the light emitting side and optical fiber sheet 23 of the light receiving side may be secured to the left and right side surfaces 21a and 21b of the center block 21 and then covered with the side covers 24 and 25 which are covered with the left and right side surfaces 21a and 21b, respectively. Also, the optical fiber sheet of the light emitting side and optical fiber sheet of the light receiving side may be secured to the left and right side surfaces of the center block, and the side covers may be formed by molding a synthetic resinous material on the left and right side surfaces of the center block in a manner to cover the optical fiber sheets of the light emitting and light receiving sides, to provide the image sensing head as a unitary structure.

From the foregoing description, it will be appreciated that according to the invention, the first and second support members support the read-out end portions and the light emitting and light receiving end portions of a plurality of optical ribers with a predetermined spacing interval between the fibers so as to support the plurality of optical fibers in the form of optical fiber sheets, and the optical fiber sheets are covered with side covers formed beforehand by injection molding or with a synthetic resinous material which is molded to cover the optical fiber sheets. This enables the image sensing head to be readily and positively produced.

According to the invention, there are provided a center block, formed by injection molding beforehand to have left and right side surfaces crossing each other in the front of the head at a predetermined angle, and first and second support members for supporting the read-out end portions and light emitting and light receiving end portions of a plurality of optical fibers in the form of optical fiber sheets with a predetermined spacing interval between the fibers. The optical fiber sheets secured to the first and second support members are mounted on the left and right side surfaces of the center block while the first and second support members are secured to the center block, and the optical fiber sheets are covered with side covers formed beforehand by injection molding or with a synthetic resinous material molded in a manner to cover the optical fiber sheets, to provide the image sensing head. The image sensing head of the image reading device constructed as aforesaid enables the optical fibers to be readily mounted in the image sensing head with a high degree of positional precision and is capable of avoiding damage to and bending of the optical fibers while allowing an image of a document to be positively read out.

The method of producing an image sensing head of an image reading device provided by the invention comprising an optical fiber winding step, an optical fiber securing step, an optical fiber cutting step and a step of covering the optical fiber with a synthetic resinous material. The image sensing head produced by the method according to the invention is capable of positively reading out an image of a document without suffering the disadvantage of the optical fibers being damaged or bent.

While preferred embodiments of the invention have been shown and described, it is to be understood that the invention is not limited to the embodiments shown and described hereinabove, and that many changes and modifications may be made therein without departing from the scope of the invention.

What is claimed is:

1. An image sensing head of an image reading device comprising:
   a plurality of optical fibers having read-out end portions exposed at one end face of the image sensing head, and light emitting and light receiving end portions exposed at an opposite end face of the image sensing head;
   a base plate disposed at said opposite end face of the image sensing head, and supporting a plurality of light emitting elements and light receiving elements in positions corresponding to the light emitting and light receiving end portions of the plurality of optical fibers; a light shield plate disposed between said opposite end face of the imaging sensing head and said base plate, and forming a plurality of apertures corresponding to said light emitting elements and light receiving elements, respectively, whereby said light emitting end portion of optical fibers receive a light beam emitted from the light emitting elements through said apertures, respectively, and said light receiving elements receive a light beam emitted from said light receiving end portions of optical fibers through said apertures, respectively.

2. An image sensing head of an image reading device as described in claim 1, wherein said light shield plate is formed with a plurality of pins on front and rear surfaces thereof. Whereby to position said shield with respect to said opposite end face of the image sensing head and said base plate.

3. An image sensing head of an image reading device as described in claim 1, wherein a pair of a first support member and a second support member having read-out end portions and light emitting end portions of the optical fibers of the light emitting side secured thereto, respectively, with a predetermined spacing interval between the fibers to support the optical fibers in the form of a sheet; and, another pair of a first support member and a second support member having read-out end portions and light receiving end portions of the optical fibers of the light receiving side secured thereto, respectively, with a predetermined spacing interval between the fibers to support the optical fibers in the form of a sheet.

4. An image sensing head of an image reading device comprising:

a center block having left and right side surfaces crossing each other in the front of the image sensing head at a predetermined angle;

a plurality of optical fibers;

a first pair of a first support member and a second support member having read-out end portions and light emitting end portions of the optical fibers of the light emitting side secured thereto, respectively, arranged on said left side surface of said center block with a predetermined spacing interval between the fibers to support the optical fibers in the form of a sheet;

a second pair of a first support member and a second support member having read-out end portions and light receiving end portions of the optical fibers of the light receiving side secured thereto, and respectively, arranged on said right side surface of said center block with a predetermined spacing interval between the fibers to support the optical fibers in the form of a sheet; the optical fibers in the form of sheets located between the first and second support members of the first pair and between the first and second support members of the second pair, respectively, being covered with a synthetic resinous material.

* * * * *